(12) United States Patent
Shimizu

(10) Patent No.: US 9,117,048 B2
(45) Date of Patent: Aug. 25, 2015

(54) SEMICONDUCTOR INTEGRATING CIRCUIT LAYOUT PATTERN GENERATING APPARATUS AND METHOD

(75) Inventor: Yukio Shimizu, Miyazaki (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 175 days.

(21) Appl. No.: 13/162,079

(22) Filed: Jun. 16, 2011

(65) Prior Publication Data

US 2011/0320988 A1 Dec. 29, 2011

(30) Foreign Application Priority Data

Jun. 23, 2010 (JP) ................................ 2010-142527

(51) Int. Cl.
*G06F 17/50* (2006.01)
(52) U.S. Cl.
CPC ........ *G06F 17/5068* (2013.01); *G06F 17/5036* (2013.01); *G06F 17/5077* (2013.01); *G06F 2217/12* (2013.01)
(58) Field of Classification Search
None
See application file for complete search history.

(56) References Cited

U.S. PATENT DOCUMENTS

| 5,348,558 | A   | * | 9/1994  | Ito et al. ........................ 29/25.01 |
| 5,995,878 | A   |   | 11/1999 | Miyajima |
| 6,057,842 | A   | * | 5/2000  | Knowlton et al. ............ 715/788 |
| 6,567,954 | B1  |   | 5/2003  | Murakoshi |
| 7,013,446 | B2  |   | 3/2006  | Ohba et al. |
| 7,340,708 | B2  | * | 3/2008  | Hamazaki ..................... 716/119 |
| 8,453,087 | B2  | * | 5/2013  | Teoh ............................. 716/110 |
| 2004/0003366 | A1 |   | 1/2004  | Suzuki |
| 2004/0049747 | A1 | * | 3/2004  | Yamasaki et al. .................. 716/4 |
| 2004/0083438 | A1 |   | 4/2004  | Ohba et al. |
| 2005/0268270 | A1 | * | 12/2005 | Kamon ............................ 716/11 |
| 2006/0271903 | A1 | * | 11/2006 | Hamazaki ....................... 716/17 |
| 2007/0028195 | A1 | * | 2/2007  | Chidambarrao et al. ......... 716/2 |
| 2011/0145775 | A1 | * | 6/2011  | Sano ............................. 716/122 |
| 2011/0320988 | A1 | * | 12/2011 | Shimizu ......................... 716/55 |

FOREIGN PATENT DOCUMENTS

JP H10-173058 A 6/1998
JP H10-256113 A 9/1998

(Continued)

OTHER PUBLICATIONS

An Office Action, "Notice of Reason for Rejection," issued by the Japanese Patent Office on Oct. 15, 2013, which corresponds to Japanese Patent Application No. 2010-142527 and is related to U.S. Appl. No. 13/162,079; with partial translation.

*Primary Examiner* — A. M. Thompson
(74) *Attorney, Agent, or Firm* — Studebaker & Brackett PC

(57) ABSTRACT

A layout pattern generating apparatus and a layout pattern generating method for an element used for layout design of a semiconductor integrated circuit (LSI) provide a reduction in time for generating a layout pattern with high versatility. The layout pattern generating apparatus for generating a layout pattern of each of elements included in a semiconductor integrated circuit, includes, for example, a storage, a basic figure generator, an additional figure generator, a display unit and an operation input unit. The apparatus and method also utilize at least terminal figure relative position information, figure adjustment value information, and additional figure relative position information, the additional figure being a figure other than the basic figure. The basic figure generator generates the effective area figure and the terminal figure of the layout pattern generation target element, and the additional figure generator generates the additional figure of the layout pattern generation target element.

20 Claims, 15 Drawing Sheets

(56) References Cited

FOREIGN PATENT DOCUMENTS

| | | | |
|---|---|---|---|
| JP | 2004-030308 A | 1/2004 |
| JP | 2004-039951 A | 2/2004 |
| JP | 2006-330970 A | 12/2006 |
| JP | 2011-124423 A | 6/2011 |

* cited by examiner

SEMICONDUCTOR INTEGRATING CIRCUIT LAYOUT PATTERN GENERATING APPARATUS AND METHOD

BACKGROUND OF THE INVENTION

1. Field of the Invention

The present invention relates to a layout pattern generating apparatus and a layout pattern generating method for an element used for layout design which is a part of a manufacturing method of a semiconductor integrated circuit (LSI).

2. Description of the Related Art

Generally, in designing LSI, when a layout of basic elements such as a transistor and a resistor, which constitutes an LSI, is generated, a layout pattern is manually described on a layout drawing layer for masking process by using a drawing machine or a layout pattern is automatically described by using a layout pattern generating apparatus for generating a layout pattern by designating in advance detailed numeric values (design standard) which indicate a mask layer to be used, its structure and a relative positional relationship in the structure. A variety of layout pattern generating apparatuses have been developed, as described in Japanese Patent Kokai Publication No. 2006-330970 (Patent Document 1), for example.

However, it takes much time to manually describe a layout pattern by using the drawing machine. Moreover, drawing errors frequently occur and it takes much time to analyze the drawing errors.

Further, the conventional layout pattern generating apparatus has little versatility. Therefore, when masking process (a drawing layer to be used) varies with each process or when a different element structure or a design standard is used for each process, it is required to develop a new layout pattern generating apparatus and the development takes much time. To solve the problem, the above-identified Patent Document 1 provides a suggestion that different definition data are used in the layout pattern generating apparatus when layouts having different processing rules from each other are generated. However, there are some cases where the problem cannot be solved by changing definition data, and moreover, it takes much labor and time to generate such definition data.

SUMMARY OF THE INVENTION

An object of the present invention is to provide a layout pattern generating apparatus and a layout pattern generating method capable of reducing time for generating a layout pattern with high versatility.

According to an aspect of the present invention, a layout pattern generating apparatus for generating a layout pattern of each of elements included in a semiconductor integrated circuit, includes: a storage; a basic figure generator; an additional figure generator; a display unit; and an operation input unit. The storage stores terminal figure relative position information including data describing a relative position of a terminal figure of a layout pattern generation target element relative to an effective area figure of the layout pattern generation target element, figure adjustment value information including data describing an adjustment value for a basic figure including the effective area figure and the terminal figure, and additional figure relative position information including data describing a relative position of an additional figure relative to the basic figure, the additional figure being a figure other than the basic figure. The basic figure generator generates the effective area figure and the terminal figure of the layout pattern generation target element on the basis of the terminal figure relative position information and the figure adjustment value information; the additional figure generator generates the additional figure of the layout pattern generation target element on the basis of the generated effective area figure, the generated terminal figure and the additional figure relative position information; the display unit displays the generated effective area figure, the generated terminal figure and the generated additional figure; and the figure adjustment value information is changed depending on an input from the operation input unit.

According to another aspect of the present invention, a layout pattern generating method being carried out by an apparatus for generating a layout pattern of each of elements included in a semiconductor integrated circuit, the method includes: storing terminal figure relative position information, figure adjustment value information and additional figure relative position information in a storage, the terminal figure relative position information including data describing a relative position of a terminal figure relative to an effective area figure of the layout pattern generation target element, the figure adjustment value information including data describing an adjustment value for a basic figure including the effective area figure and the terminal figure, the additional figure relative position information including data describing a relative position of an additional figure relative to the basic figure, the additional figure being a figure other than the basic figure; generating the effective area figure and the terminal figure of the layout pattern generation target element on the basis of the terminal figure relative position information and the figure adjustment value information; generating the additional figure of the layout pattern generation target element on the basis of the generated effective area figure, the generated terminal figure and the additional figure relative position information; displaying the generated effective area figure, the generated terminal figure and the generated additional figure on a display unit; and changing the figure adjustment value information depending on an input from an operation input unit.

The layout pattern generating apparatus and layout pattern generating method according to the present invention achieve effects to reduce time for generating a layout pattern and to improve versatility.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Figure 1:
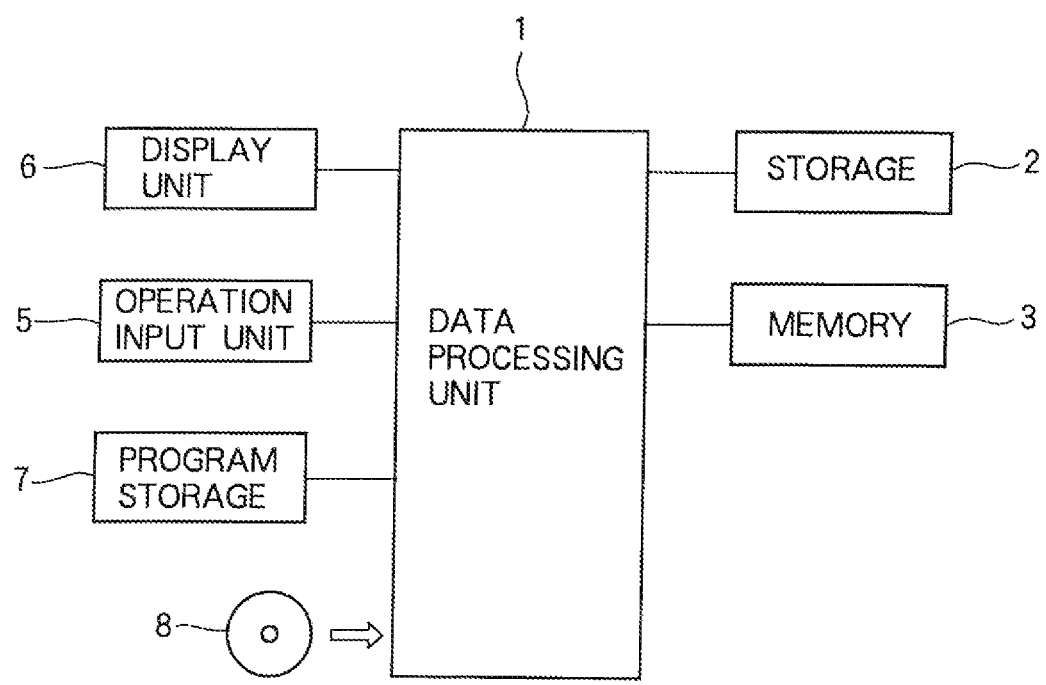
FIG. 1 is a block diagram schematically illustrating structure of a layout pattern generating apparatus according to first to third embodiments of the present invention.

FIG. 1 is a block diagram schematically illustrating structure of a layout pattern generating apparatus according to first to third embodiments of the present invention, i.e., an apparatus capable of carrying out a layout pattern generating method according to the first to third embodiments.

The layout pattern generating apparatus illustrated in FIG. 1 is an apparatus used for designing a layout of a basic element formed on a semiconductor substrate for manufacturing a semiconductor integrated circuit device (LSI), i.e., a layout pattern drawing apparatus for drawing a layout for a semiconductor integrated circuit. The layout pattern generating apparatus illustrated in FIG. 1 is not an apparatus for generating a layout of a plurality of elements in a semiconductor chip, but is an apparatus for generating a layout of each of the elements (an individual element).

The layout pattern generating apparatus illustrated in FIG. 1 includes a data processing unit 1 having a CPU and other components, a storage 2 such as a hard disk drive, a memory 3 such as a semiconductor memory, an operation input unit 5 such as a keyboard and a mouse, a display unit 6 such as a liquid crystal monitor, and a program storage 7 which stores an installed program, for example. The layout pattern generating apparatus illustrated in FIG. 1 is a computer system which operates on the basis of the installed program, for example. The program for the layout pattern generating apparatus can be installed from an information recording medium 8, such as an optical disc, on which the program to be installed is recorded. The storage 2 and the program storage 7 may be independent hard disk drives or may be different recording areas in the same hard disk drive.

First Embodiment

Figure 2:
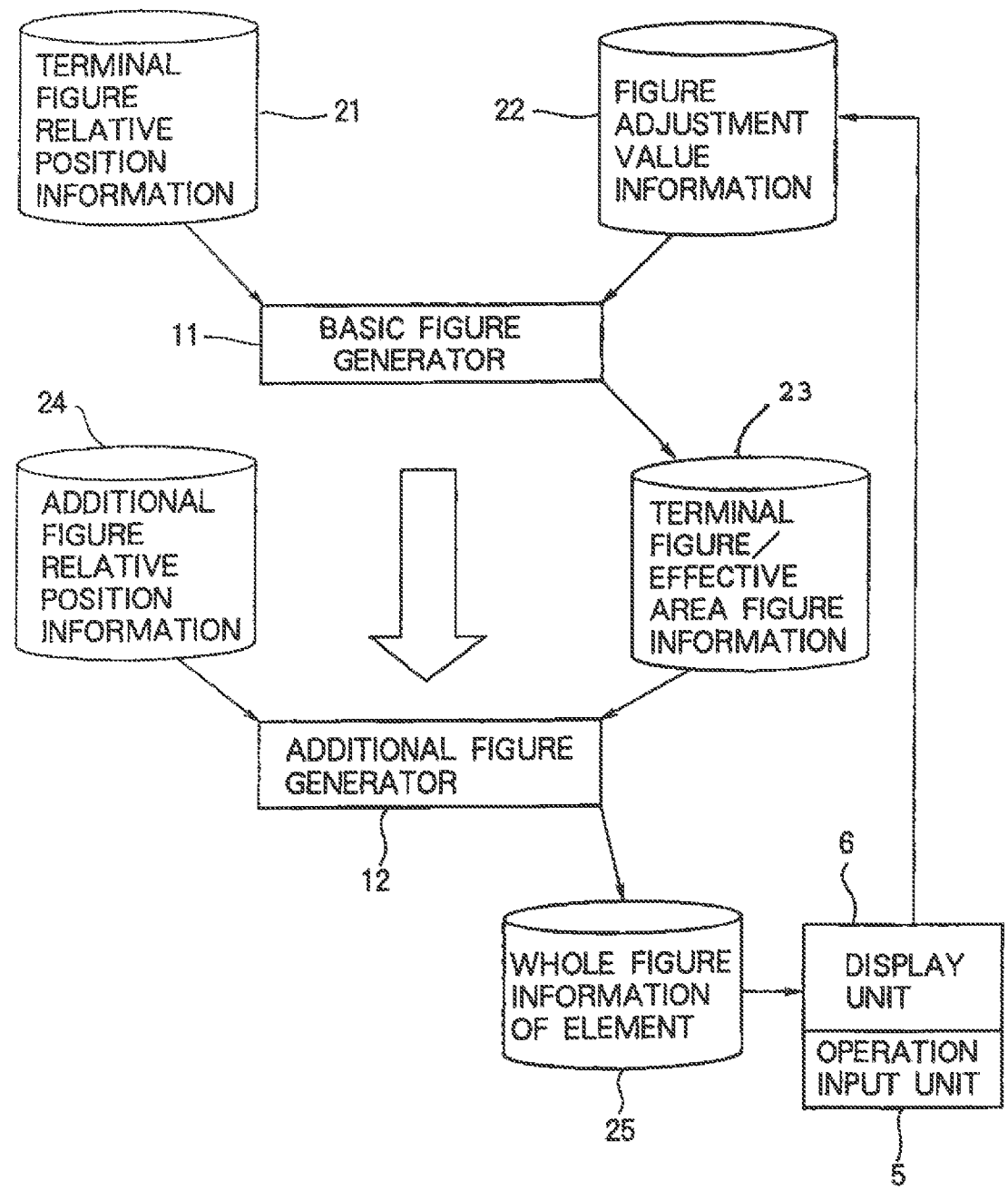
FIG. 2 is an explanatory diagram illustrating structure and operation of the layout pattern generating apparatus according to the first embodiment.

FIG. 2 is an explanatory diagram illustrating structure and operation of the layout pattern generating apparatus according to the first embodiment. The layout pattern generating apparatus according to the first embodiment is a layout pattern generating apparatus for generating a layout pattern on an element used for layout designing which is a part of a semiconductor integrated circuit (LSI) manufacturing method. The layout pattern generating apparatus performs the process illustrated in FIG. 28.

In FIG. 2, a basic figure generator (i.e., a terminal figure and effective area figure generator) 11 and an additional figure generator 12 can be included in the data processing unit 1 in FIG. 1, for example. The basic figure generator 11 and the additional figure generator 12 may be independent data processing units. In FIG. 2, terminal figure relative position information 21, figure adjustment value information 22, a basic figure i.e., a terminal figure and/or effective area figure (hereinafter also referred to as a "terminal figure/effective area figure") 23 and whole figure information 25 of a layout pattern generation target element are stored in the storage 2 or the memory 3 in FIG. 1, for example (step S1 in FIG. 28).

In FIG. 2, the terminal figure relative position information 21 includes data describing a relative position of a terminal figure, which is a figure of a terminal area (which is also referred to as a "terminal") of the layout pattern generation target element, relative to an effective area figure, which a figure of an area (i.e., effective area) effective as the layout pattern generation target element. When the layout pattern generation target element is a MOS transistor, the effective area figure is a figure of an area which is effective as a gate, and when the layout pattern generation target element is a resistor element, the effective area figure is a figure of an area which functions as a resistor, for example.

In FIG. 2, the figure adjustment value information 22 includes data describing an adjustment value for the effective area figure of the layout pattern generation target element. The adjustment value or values for the effective area figure of the layout pattern generation target element include a width of the effective area figure, a height of the effective area figure, a distance between the effective area figure and the terminal figure, and the like, for example.

Figure 28:
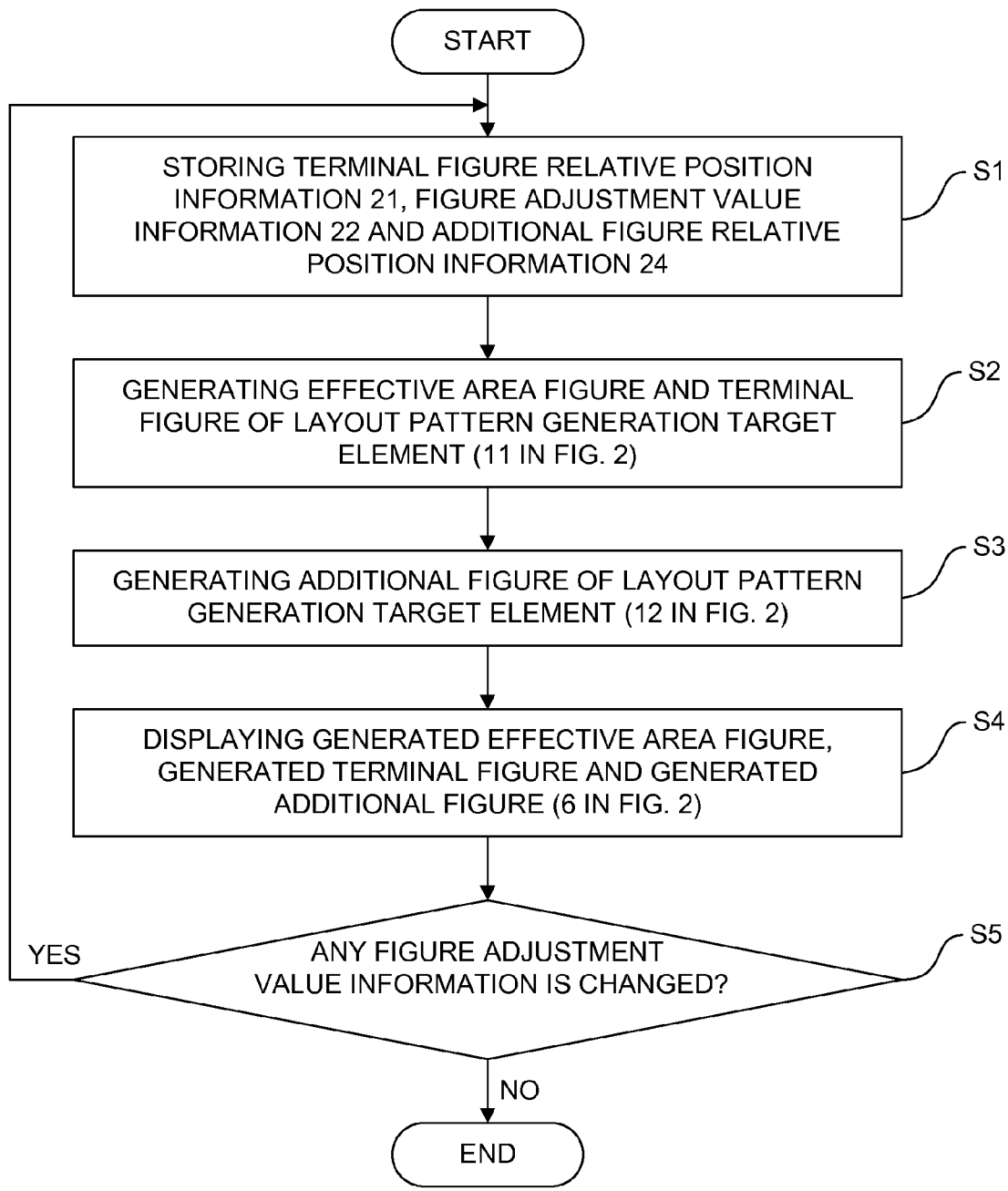
FIG. 28 is a flowchart illustrating a layout pattern generating method according to the first embodiment.

The basic figure generator 11 generates the effective area figure and the terminal figure of the layout pattern generation target element on the basis of the terminal figure relative position information 21 and the figure adjustment value information 22 (step S2 in FIG. 28).

Figure 23:
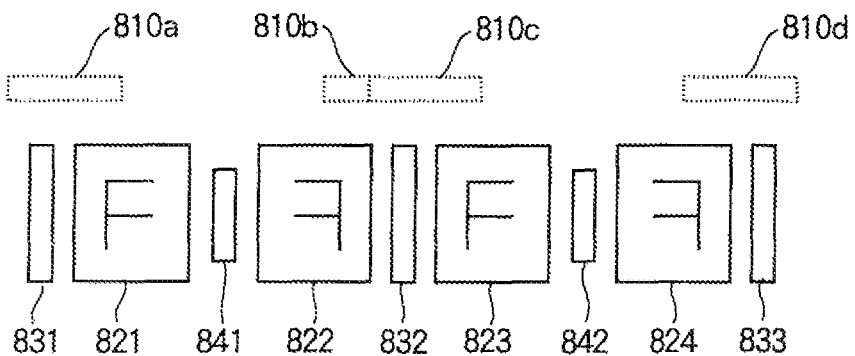
FIG. 23 is a diagram illustrating an example of an additional figure generated by a first additional figure generator in the layout pattern generating apparatus according to the third embodiment.

In FIG. 2, the terminal figure/effective area FIG. 23 is figure data describing the effective area figure and the terminal figure of the layout pattern generation target element which are generated by the basic figure generator 11.

In FIG. 2, additional figure relative position information 24 includes data describing a relative position of all figures other than the effective area figure and the terminal figure of the layout pattern generation target element which form a mask pattern for manufacturing the layout pattern generation target element, relative to the effective area figure and/or the terminal figure of the layout pattern generation target element (step S1 in FIG. 28).

The additional figure generator 12 automatically generates a figure indicating the layout pattern generation target element, other than the effective area figure and the terminal figure of the layout pattern generation target element, on the basis of the terminal figure/effective area FIG. 23 and the additional figure relative position information 24 (step S3 in FIG. 28).

Referring to FIG. 2, the whole figure information 25 includes data describing the effective area figure and the terminal figure of the layout pattern generation target element generated by the basic figure generator 11 and including the figure generated by the additional figure generator 12.

The display unit 6 displays an image based on the whole figure information 25 of the layout pattern generation target element (step S4 in FIG. 28). The operation input unit 5 is an input unit which is operated by a user. A user operates the operation input unit 5 while viewing a screen of the display unit 6. The figure adjustment value information is inputted to the operation input unit 5, for example (step S5 in FIG. 28).

Figure 3:
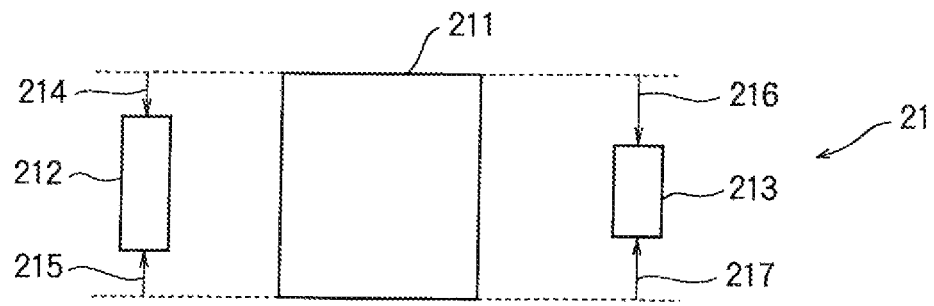
FIG. 3 is a diagram illustrating an example of information described as terminal figure relative position information in the layout pattern generating apparatus according to the first embodiment, when a layout pattern generation target element is a MOS transistor.

FIG. 3 is a diagram illustrating an example of information described as the terminal figure relative position information 21 when the layout pattern generation target element is the MOS transistor. As shown in FIG. 3, the terminal figure relative position information 21 includes relative position information (e.g., 214 to 217) of all terminal figures (e.g., FIGS. 212 and 213) relative to the effective area figure (e.g., a FIG. 211).

Figure 4:
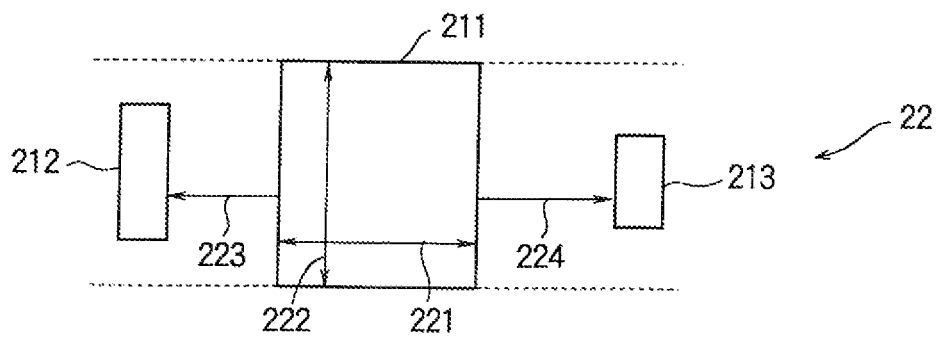
FIG. 4 is a diagram illustrating an example of information described as figure adjustment value information in the layout pattern generating apparatus according to the first embodiment, when the layout pattern generation target element is the MOS transistor.

FIG. 4 is a diagram illustrating an example of information described in the figure adjustment value information 22 when the layout pattern generation target element is the MOS transistor. As shown in FIG. 4, the figure adjustment value information 22 includes adjustment values for the effective area figure of the layout pattern generation target element (e.g., the FIG. 211). More specifically, the figure adjustment value information 22 includes a width of the effective area figure of the layout pattern generation target element (e.g., distance 221), a height of the effective area figure of the layout pattern generation target element (e.g., distance 222), an interval between the terminal figure of a terminal "A" and the effective area figure (e.g., distance 223), and an interval between the terminal figure of a terminal "B" and the effective area figure (e.g., distance 224). Each of the adjustment values for the effective area figure of the layout pattern generation target element is a minimum value of drawing reference values, in an initial state.

Figure 5:
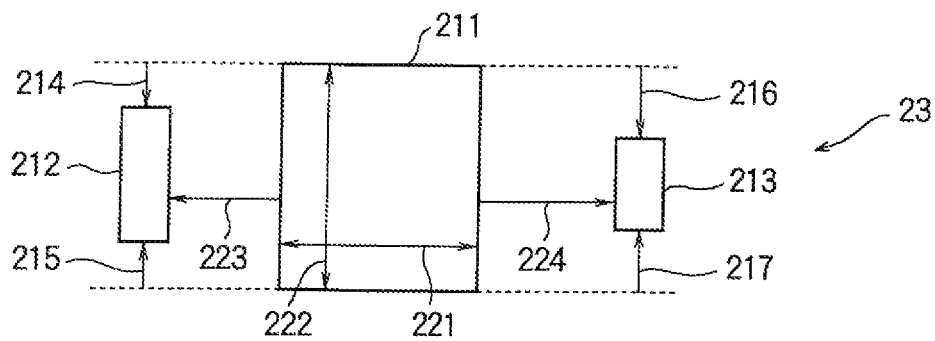
FIG. 5 is a diagram illustrating an example of a terminal figure and an element effective area figure generated in the layout pattern generating apparatus according to the first embodiment, when the layout pattern generation target element is the MOS transistor.

FIG. 5 is a diagram illustrating an example of a figure generated as the terminal figure/effective area FIG. 23 when the layout pattern generation target element is the MOS transistor. As illustrated in FIG. 5, the basic figure generator 11 generates the effective area figure and all of the terminal figures of the layout pattern generation target element with reference to the terminal figure relative position information 21 and the figure adjustment value information 22, and then outputs data of the generated figure as the terminal figure/effective area FIG. 23. A group of figures which includes a set of the effective area figure and the terminal figure of the layout pattern generation target element is also referred to as a "basic figure".

Figure 6:
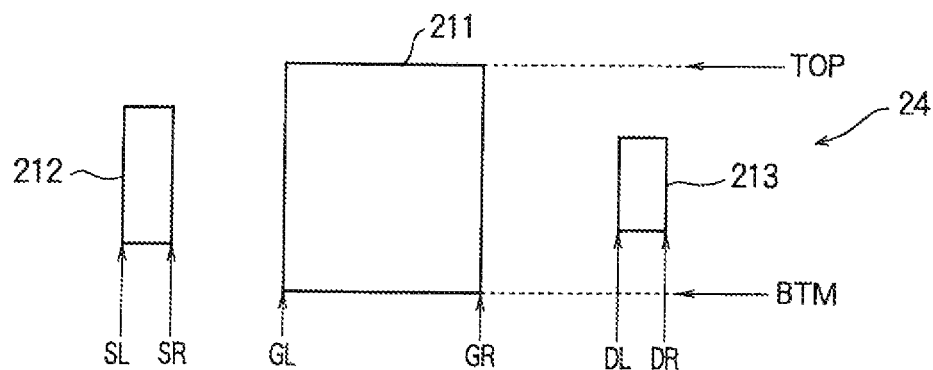
FIG. 6 is a diagram illustrating an example of reference points for relative position in additional figure relative position information in the layout pattern generating apparatus according to the first embodiment, when the layout pattern generation target element is the MOS transistor.

FIG. 6 is a diagram illustrating an example of reference points for the relative positions used in the additional figure relative position information 24, when the layout pattern generation target element is the MOS transistor. The additional figure relative position information 24 includes the relative positions of all figures other than the basic figure (the effective area figure and the terminal figure) relative to the effective area figure and/or the terminal figure of the layout pattern generation target element. The relative position is described as a combination of a location of a reference point and a distance from the reference point for each side forming a box-shaped figure to be generated. In the example of FIG. 6, there are two kinds of the reference points in a vertical direction: an upper end TOP and a bottom end BTM of the effective area figure of the layout pattern generation target element; and there are six kinds of the reference points in a horizontal direction: a left end SL and a right end SR of the terminal figure 212 of the terminal "A", a left end DL and a right end DR of the terminal FIG. 213 of the terminal "B", and a left end GL and a right end GR of the effective area FIG. 211.

Figure 7:
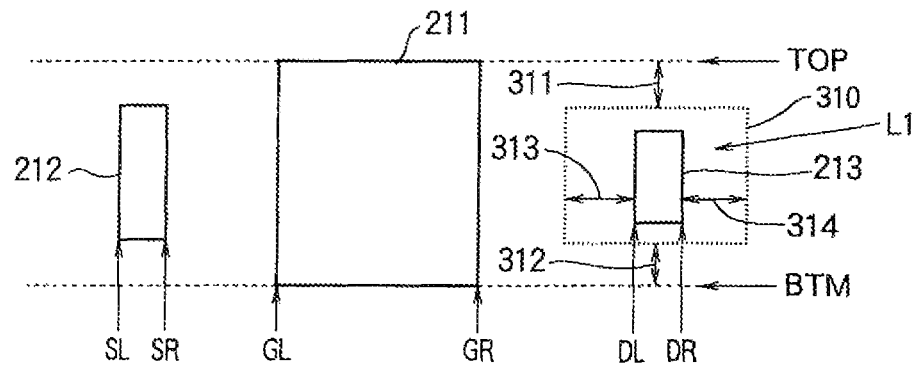
FIG. 7 is a diagram illustrating a definition example on a first drawing layer generated by an additional figure generator in the layout pattern generating apparatus according to the first embodiment, when the layout pattern generation target element is the MOS transistor.

FIG. 7 is a diagram illustrating a definition example on a first drawing layer L1 generated by the additional figure generator 12, when the layout pattern generation target element is the MOS transistor. The definition example on the first drawing layer L1 defines an upper end, a lower end, a left end and a right end of a FIG. 310 on the first drawing layer L1. The upper end of the FIG. 310 is at a distance 311 from the upper end TOP of the effective area FIG. 211; the lower end of the FIG. 310 is at a distance 312 from the lower end BTM of the effective area FIG. 211; the left end of the FIG. 310 is at a distance 313 from the left end DL of the terminal FIG. 213; and the right end of the FIG. 310 is at a distance 314 from the right end DR of the terminal FIG. 213. For convenience of explanation, the definition of the upper end, the lower end, the left end and the right end of the FIG. 310 on the first drawing layer L1 is described as follows:

"First Drawing Layer L1:
(TOP 311), (BTM 312), (DL 313), (DR 314)"

As to values of the distances 311 to 314 which designate the distances from the basic figure, if a side of the figure generated on the first drawing layer L1 is on a right of or above the basic figure, a distance from the basic figure has a positive value; and if the side is on a left of or below the basic figure, the distance from the basic figure has a negative value. In FIG. 7, the distances 311 and 314 have positive values; and the distances 312 and 313 have negative values.

Figure 8:
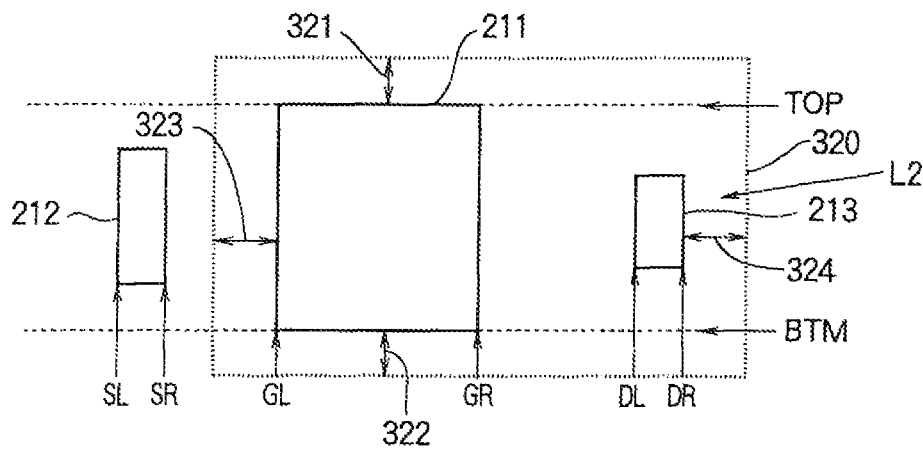
FIG. 8 is a diagram illustrating a definition example on a second drawing layer generated by the additional figure generator in the layout pattern generating apparatus according to the first embodiment, when the layout pattern generation target element is the MOS transistor.

FIG. 8 is a diagram illustrating a definition on a second drawing layer L2 generated by the additional figure generator 12, when the layout pattern generation target element is a MOS transistor. The definition example on the second drawing layer L2 defines an upper end, a lower end, a left end and a right end of a FIG. 320 on the second drawing layer L2. The upper end of the FIG. 320 of the second drawing layer L2 is at a distance 321 from the upper end TOP of the effective area FIG. 211; the lower end of the FIG. 320 is at a distance 312 from the lower end of the effective area FIG. 211; the left end of the FIG. 320 is at a distance 323 from the left end GL of the effective area FIG. 211; and the right end of the FIG. 320 is at a distance 324 from the right end DR of the terminal FIG. 213. For convenience of explanation, the definition of the upper end, the lower end, the left end and the right end of the FIG. 320 on the second drawing layer L2 is described as follows:

"Second Drawing Layer L2:
(TOP 321), (BTM 322), (GL 323), (DR 324)"

As to values of the distances 321 to 324 which designate the distances from the basic figure, if a side of the figure generated on the second drawing layer L2 is on a right of or above the basic figure, a distance from the basic figure has a positive value; and if the side is on a left of or below the basic figure, the distance from the basic figure has a negative value. In FIG. 8, the distances 321 and 324 have positive values; and the distances 322 and 323 have negative values.

Figure 9:
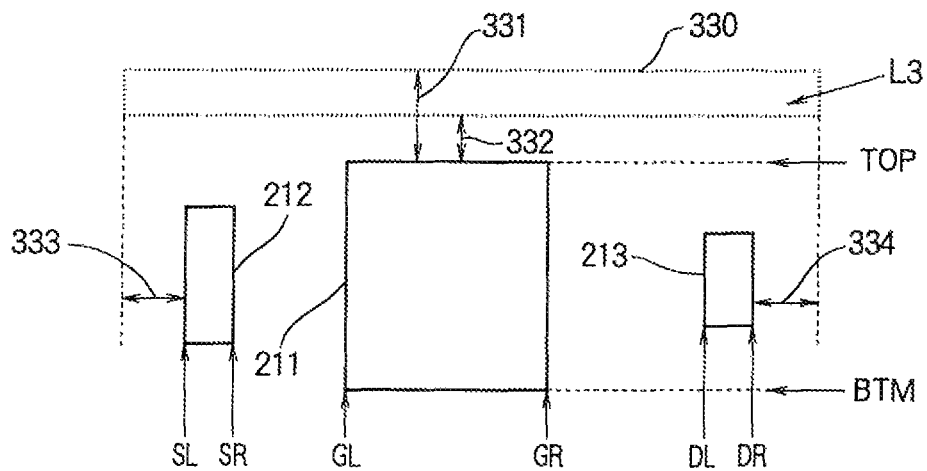
FIG. 9 is a diagram illustrating a definition example on a third drawing layer generated by the additional figure generator in the layout pattern generating apparatus according to the first embodiment, when the layout pattern generation target element is the MOS transistor.

FIG. 9 is a diagram illustrating a definition example on a third drawing layer L3 generated by the additional figure generator 12, when the layout pattern generation target element is the MOS transistor. The definition example on the third drawing layer L3 defines an upper end, a lower end, a left end and a right end of a FIG. 330 on the third drawing layer L3. The upper end of the FIG. 330 is at a distance 331 from the upper end TOP of the effective area FIG. 211; the lower end of the FIG. 330 is at a distance 332 from the upper end TOP of the effective area FIG. 211; the left end of the FIG. 330 is at a distance 333 from the left end SL of the terminal FIG. 212; and the right end of the FIG. 330 is at a distance 334 from the right end DR of the terminal FIG. 213. For convenience of explanation, a definition of the upper end, the lower end, the left end and the right end of the FIG. 330 on the third drawing layer L3 is described as follows:

"Third Drawing Layer L3:
(TOP 331), (TOP 332), (SL 333), (DR 334)"

As to values of the distances 331 to 334 which designate the distances from the basic figure, if a side of the figure generated on the third drawing layer L3 is on a right of or above the basic figure, a distance from the basic figure has a positive value; and if it is on a left of or below the basic figure, the distance from the basic figure has a negative value. In FIG. 9, the distances 331, 332 and 334 have positive values; and the distance 333 has a negative value.

Figure 10:
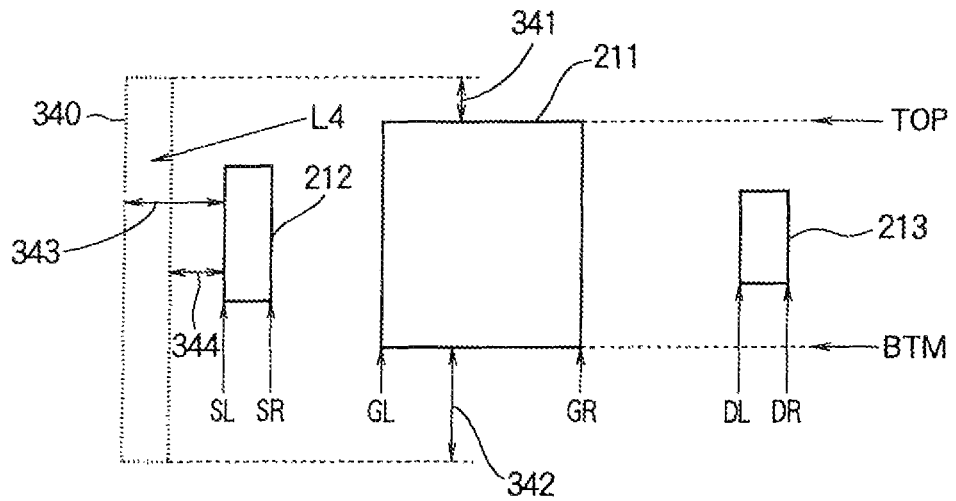
FIG. 10 is a diagram illustrating a definition example on a fourth drawing layer generated by the additional figure generator in the layout pattern generating apparatus according to the first embodiment, when the layout pattern generation target element is the MOS transistor.

FIG. 10 is a diagram illustrating a definition example on a fourth drawing layer L4 generated by the additional figure generator 12, when the layout pattern generation target element is the MOS transistor. The definition example on the fourth drawing layer L4 defines an upper end, a lower end, a left end and a right end of a FIG. 340 on the fourth drawing layer L4. The upper end of the FIG. 340 is at a distance 341 from the upper end TOP of the effective area FIG. 211; the lower end of the FIG. 340 is at a distance 342 from the lower end BTM of the effective area FIG. 211; the left end of the FIG. 340 is at a distance 343 from the left end SL of the terminal FIG. 212; and the right end of the FIG. 340 is at a distance 344 from the left end SL of the terminal FIG. 212. For convenience of explanation, a definition of the upper end, the lower end, the left end and the right end of the FIG. 340 on the fourth drawing layer L4 is described as follows:

"Fourth Drawing Layer L4:
(TOP 341), (BTM 342), (SL 343), (DR 344)"

As to values of the distances 341 to 344 which designate the distances from the basic figure, if a side of the figure generated on the fourth drawing layer L4 is on a right of or above the basic figure, a distance from the basic figure has a positive value; and if the side is on a left of or below the basic figure, the distance from the basic figure has a negative value. In FIG. 10, the distance 341 has a positive value; and the distances 342, 343 and 344 have negative values.

The additional figure generator 12 locates a reference point from a figure of the terminal figure/effective area FIG. 23 generated by the basic figure generator 11 and thereby generates an actual figure of all figures described in the additional figure relative position information 24 on the basis of reference points and distances for each sides. The additional figure generator 12 adds both of the effective area figure and the terminal figure of the layout pattern generation target element and the figure indicating the layout pattern generation target element generated by the additional figure generator 12, thereby generates the whole figure information 25 of the layout pattern generation target element, and causes the display unit 6 to display all of the generated figures of the layout pattern generation target element.

Figure 25:
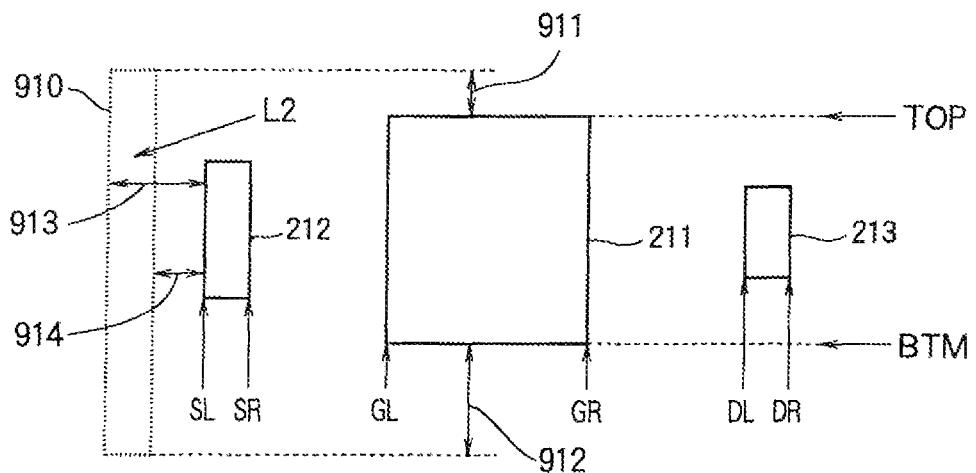
FIG. 25 is a diagram illustrating another example of the figure including the additional figure generated in the layout pattern generating apparatus according to the third embodiment.

The display unit 6 displays all of the FIG. 25 of the layout pattern generation target element. The display unit 6 has the operation input unit (reference numeral 5 in FIG. 1) which enables a user to designate an adjustment value for the layout pattern generation target element. The user changes the adjustment value for the displayed element, if necessary. As a result of the change in the adjustment value by the user, the figure adjustment value information 22 is updated. The basic figure generator 11 updates the effective area figure and the terminal figure so as to reflect the change in the adjustment value, and outputs the updated terminal figure/effective area FIG. 23. On the basis of the updated effective area figure and terminal figure, the additional figure generator 12 regenerates a regenerated additional figure, outputs a regenerated whole figure information 25 which reflects the change in the adjustment value, and then causes the display unit 6 to display figures in the regenerated whole figure information 25.

Figure 11:
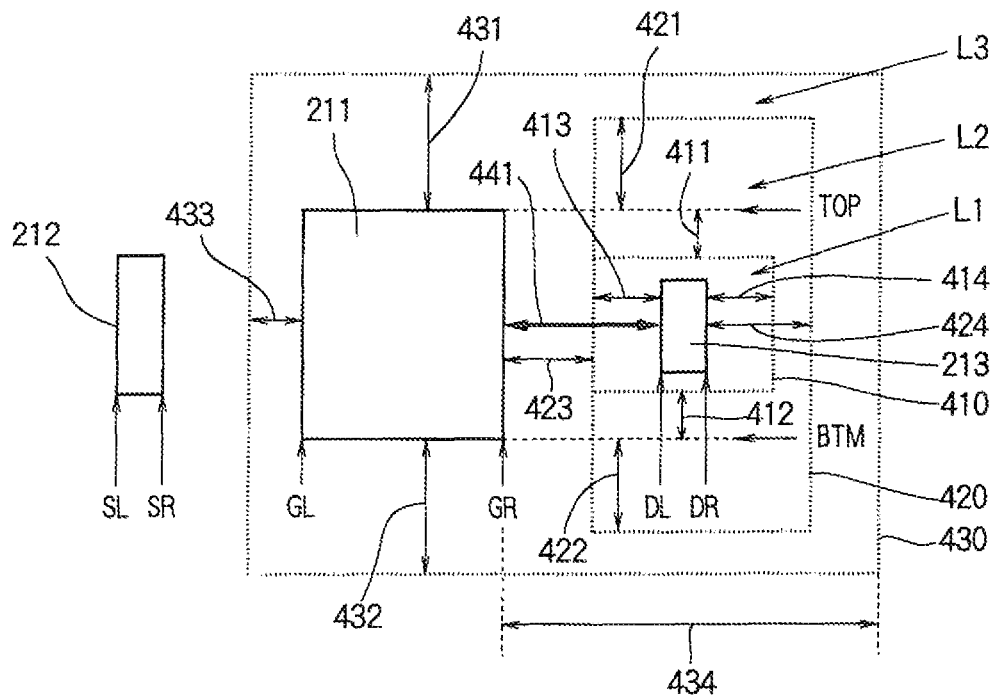
FIG. 11 is a diagram illustrating a shape of additional figure after an adjustment value is changed in the layout pattern generating apparatus according to the first embodiment, when the layout pattern generation target element is the MOS transistor.
Figure 12:
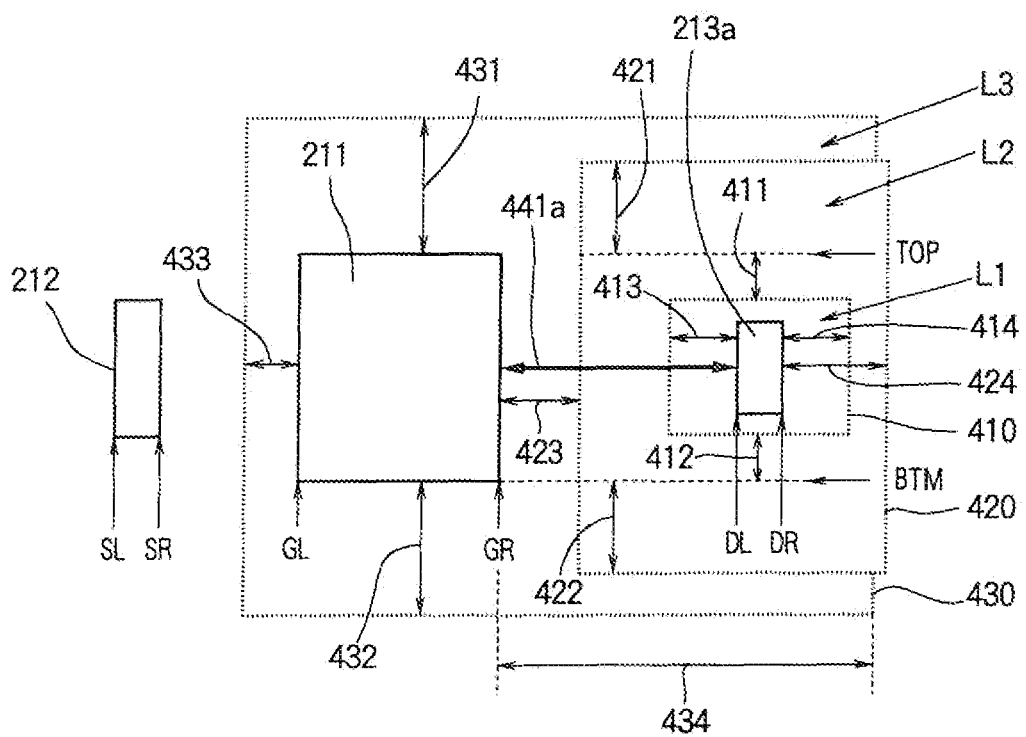
FIG. 12 is a diagram illustrating another shape of the additional figure after the adjustment value is changed in the layout pattern generating apparatus according to the first embodiment, when the layout pattern generation target element is the MOS transistor.

FIG. 11 and FIG. 12 are diagrams illustrating an example that the additional figure changes in shape due to a difference in a reference point after the adjustment value changes. FIG. 12 illustrates an example that a distance between the effective area FIG. 211 and the terminal FIG. 213 of the layout pattern generation target element is changed as the adjustment value: a distance 441 between the effective area FIG. 211 and the terminal FIG. 213 in FIG. 11 is changed to a distance 441a between the effective area FIG. 211 and the terminal FIG. 213a in FIG. 12. If a positional relationship between the effective area figure and the terminal figure changes as a result of a change in the adjustment value described as the figure adjustment value information 22, the additional figure generated by the additional figure generator 12 also changes in shape depending on its reference point. Even if a reference point changes in position, the additional figure generator 12 generates an additional figure at the same distance from the changed reference point. For this reason, after the adjustment value is changed, the additional figure whose shape differs from that before the change of the adjustment value is generated due to the change in its reference point.

In FIG. 11 and FIG. 12, an upper end, a lower end, a left end and a right end of a FIG. 410 on the first drawing layer L1 are defined as follows:

"First Drawing Layer L1:

(TOP 411), (BTM 412), (DL 413), (DR 414)"

An upper end, a lower end, a left end and a right end of a FIG. 420 on the second drawing layer L2 are defined as follows:

"Second Drawing Layer L2:

(TOP 421), (BTM 422), (GR 423), (DR 424)"

An upper end, a lower end, a left end and a right end of a FIG. 430 on the third drawing layer L3 are defined as follows:

"Third Drawing Layer L3:

(TOP 431), (BTM 432), (GL 433), (GR 434)"

In FIG. 11, the left end of the FIG. 213 which is a reference point is at the distance 441 from the right end GR of the FIG. 211; and in FIG. 12, on the other hand, the left end of the FIG. 213a is at the distance 441a from the right end GR of the FIG. 211. Thus, the additional figure is generated with the unchanged distance from the reference point, even if the reference point changes, and the additional figures before and after the adjustment value is changed differ in shape due to the change in the reference point.

Thus, the basic figure generator 11 generates the figure which has a function of generating a shape variation of the element according to the adjustment value prepared in advance, by obtaining a width and a height of the effective area figure of the layout pattern generation target element and an interval between the effective area figure and the terminal figure of the layout pattern generation target element from the terminal figure relative position information 21 and the figure adjustment value information 22. Generally, in a layout pattern of an element such as a transistor or a resistor, a relative positional relationship between the effective area figure and the terminal figure of the layout pattern generation target element is independent of a drawing reference value and a shape on a drawing layer necessary for masking process. For this reason, the basic figure generator 11 is independent of the drawing reference value and the shape on the drawing layer necessary for masking process.

The additional figure generator 12 can generate any number of various additional figure for the effective area figure and the terminal figure generated by the basic figure generator 11, by supplying information relative to the drawing layer, and so the additional figure generator 12 can easily generate a desired figure pattern only by changing content of the additional figure relative position information 24, even if the element has structure in which mask structures are greatly different from each other. Thus, the additional figure generator 12 is also independent of the drawing reference value and the shape on the drawing layer necessary for masking process.

When the shape of the effective area figure of the layout pattern generation target element or an interval between the effective area figure and the terminal figure is changed by changing the adjustment value through the operation input unit 5, the shapes of the effective area figure and the terminal figure of the layout pattern generation target element are automatically changed, and the additional figure which is generated with reference to the effective area figure and the terminal figure is accordingly changed. Thus, the layout pattern generating apparatus according to the first embodiment can easily change all figures of the element, only by changing the adjustment value through the operation input unit 5, without changing the structure of the element.

Moreover, it can be defined how the additional figure follows the change in the adjustment value or that the additional figure does not follow, by describing which reference point is adopted to generate the additional figure in the additional figure relative position information 24. Thus, both a figure influenced by the change in the adjustment value and a figure not influenced can be easily generated.

As described above, the layout pattern generating apparatus and the layout pattern generating method according to the first embodiment can easily generate figures on all drawing layers necessary as the layout pattern generation target element for masking process, only by inputting simple information on a relative position of the terminal figure and the additional figure, in any element whose shapes of the effective area figure and the terminal figure and a relative position are the same as the layout pattern generation target element, regardless of a drawing reference value or a shape on the drawing layer. Moreover, the layout pattern generating apparatus and the layout pattern generating method according to the first embodiment can easily change all figures on the drawing layer, only by changing the adjustment value, without changing a design standard.

Second Embodiment

Figure 13:
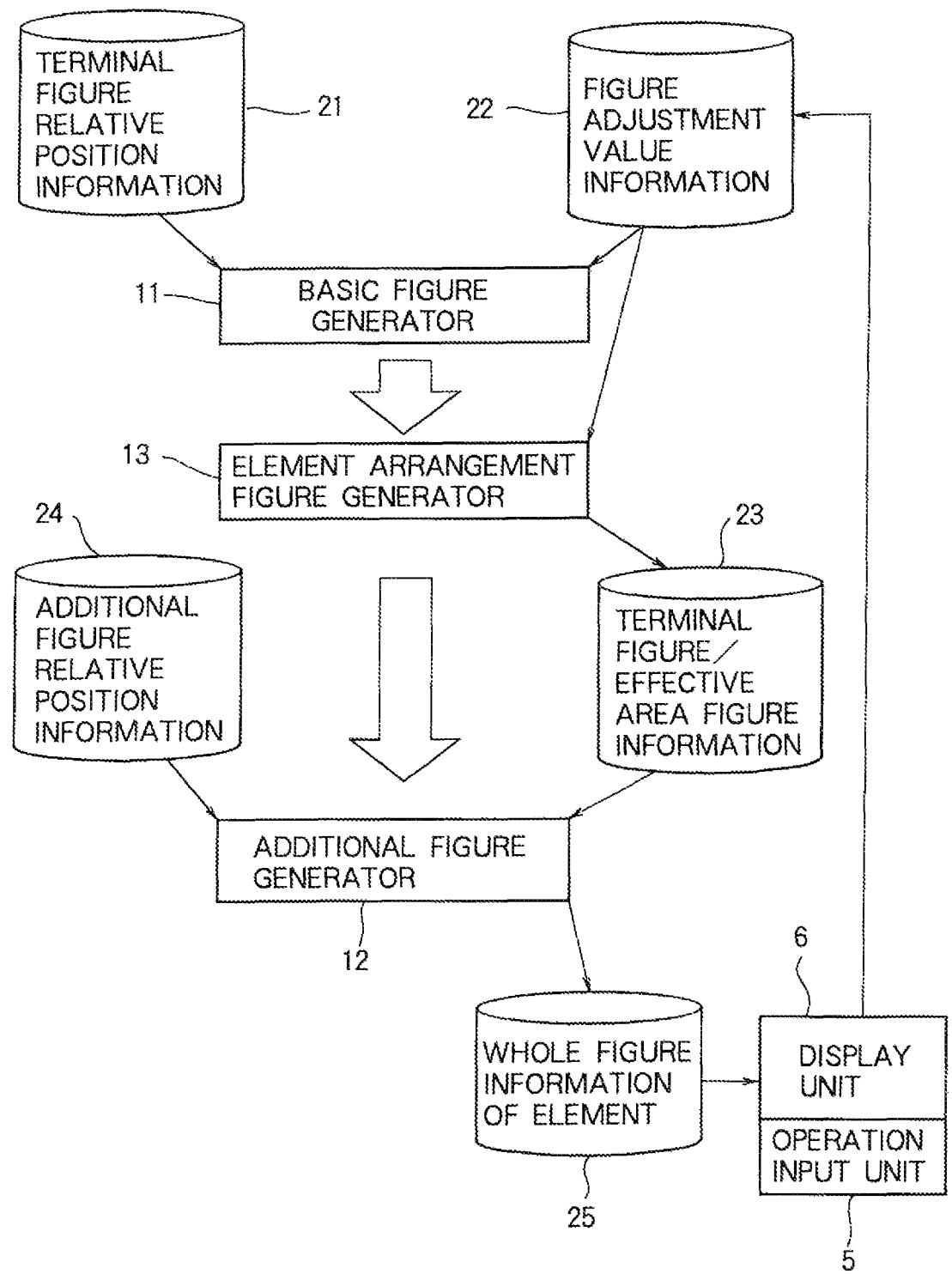
FIG. 13 is an explanatory diagram illustrating structure and operation of the layout pattern generating apparatus according to the second embodiment.

FIG. 13 is an explanatory diagram illustrating structure and operation of a layout pattern generating apparatus according to the second embodiment. In FIG. 13, constituent elements that are the same as or correspond to those in FIG. 2 are assigned the same reference characters. The layout pattern generating apparatus according to the second embodiment additionally has an element arrangement figure generator 13 and differs from the layout pattern generating apparatus according to the first embodiment in this point. The layout pattern generating apparatus performs the process illustrated in FIG. 29. The common steps in FIG. 29 and FIG. 28 are labeled by the same references.

Figure 29:
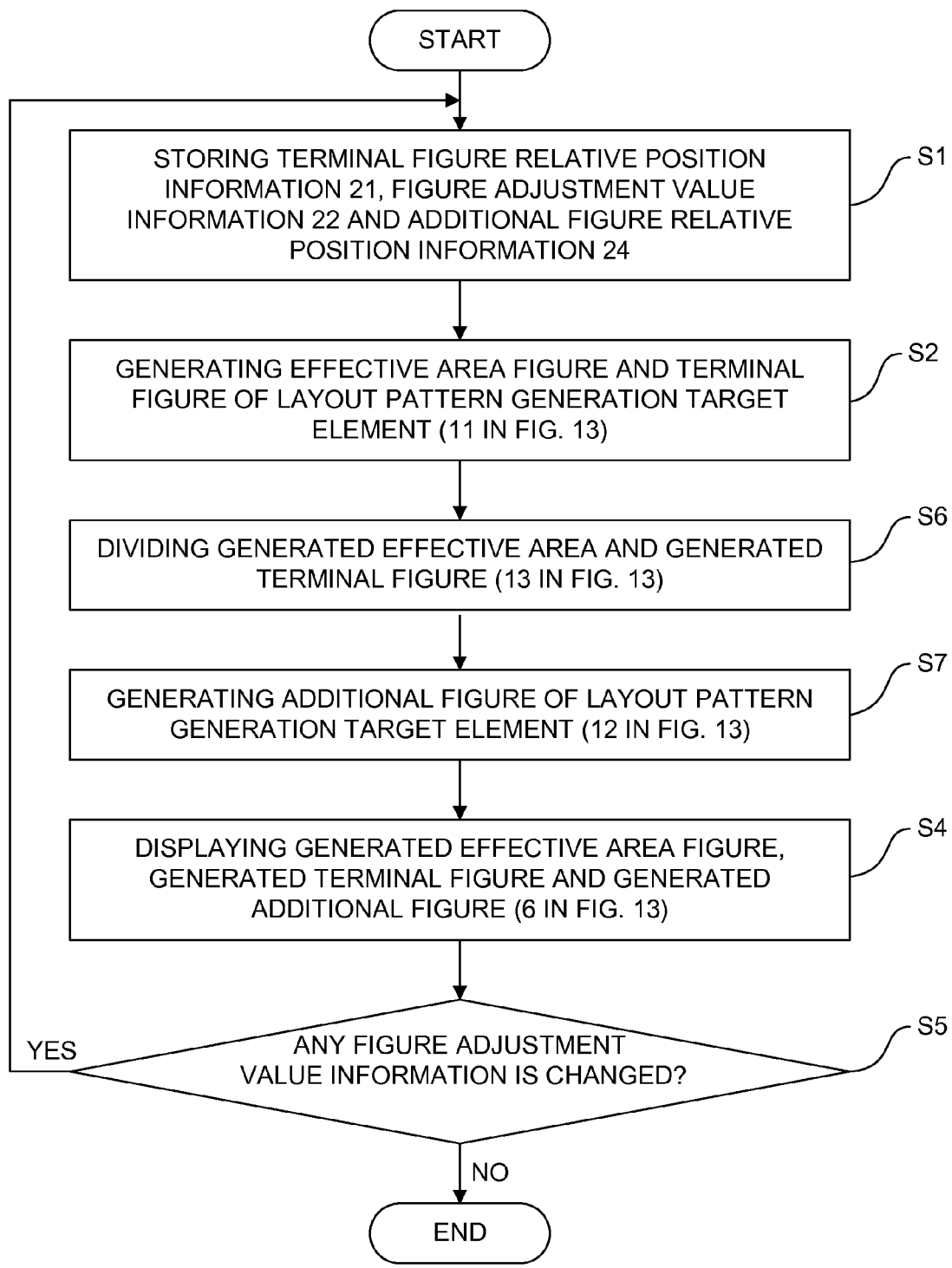
FIG. 29 is a flowchart illustrating a layout pattern generating method according to the second embodiment.

The element arrangement figure generator 13 divides a group of figures of an element which are generated by the basic figure generator 11 according to a predetermined division rule, generates a plurality of divided figures, and generates an arrangement of the figures (step S6 in FIG. 29). In FIG. 13, the basic figure generator 11, the additional figure generator 12 and the element arrangement figure generator 13 can be included in the data processing unit 1 in FIG. 1, for example. However, the basic figure generator 11, the additional figure generator 12 and the element arrangement figure generator 13 may be independent data processing units.

In FIG. 13, the figure adjustment value information 22 includes an arrangement number (a division number) for generating an arrangement after the element is divided by the element arrangement figure generator 13, and information on shapes of the terminal figure and the effective area figure of each element, if a number of arranged elements is considered. In an initial state, the figure adjustment value information 22 includes the arrangement number of "1" and figure information for generating the effective area figure and the terminal figure necessary for the element where the arrangement number is "1", in addition to the information described in the first embodiment. The layout pattern generating apparatus according to the second embodiment operates in the same manner as the layout pattern generating apparatus according to the first embodiment, when the arrangement number is "1" in the figure adjustment value information 22.

Next, a case will be explained where the figure adjustment value information 22 includes the division number of one or more and information on the shapes of the effective area figure and the terminal figure after the element is divided. Such a case may be caused by changing the arrangement number (division number) through the operation input unit 5, for example.

The basic figure generator 11 generates a basic figure for a divided element. A shape of generated figure varies depending on a kind of the layout pattern generation target element. In an element of the same kind, figures are divided in the same way. An explanation will be given below as to figures before and after a MOS transistor is divided and figures before and after a resistor is divided.

Figure 14:
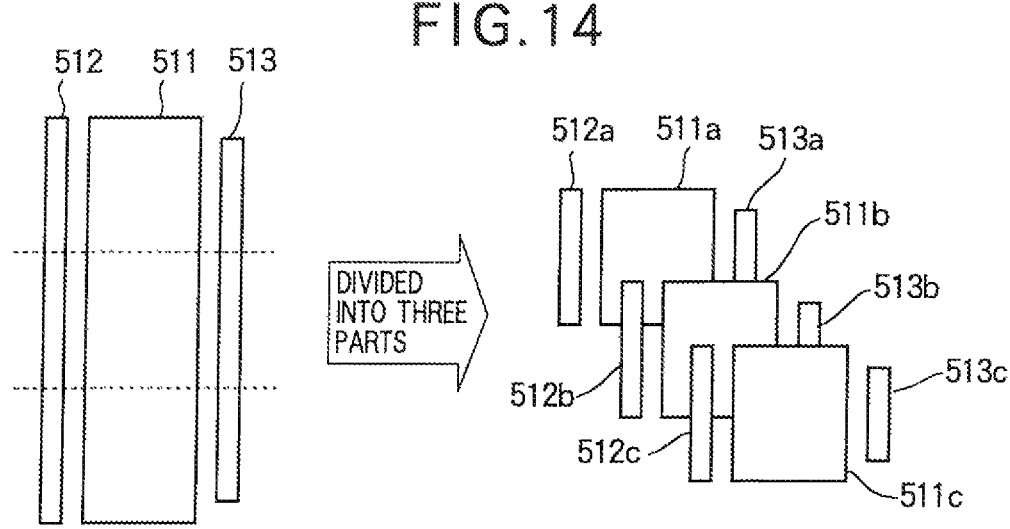
FIG. 14 is a diagram illustrating an example of a division in the layout pattern generating apparatus according to the second embodiment, when a layout pattern generation target element is a MOS transistor.

FIG. 14 is a diagram illustrating an example of when the MOS transistor is divided as the layout pattern generation target element. The element arrangement figure generator 13 generates an arrangement figure in which the basic figure generated by the basic figure generator 11 is arranged in an arrangement determined depending on a kind of the layout pattern generation target element. In the example of FIG. 14, an effective area FIG. 511 is divided into three effective area FIGS. 511a, 511b and 511c; a terminal FIG. 512 is divided into three terminal FIGS. 512a, 512b and 512c; and a terminal FIG. 513 is divided into three terminal FIGS. 513a, 513b and 513c.

Figure 15:
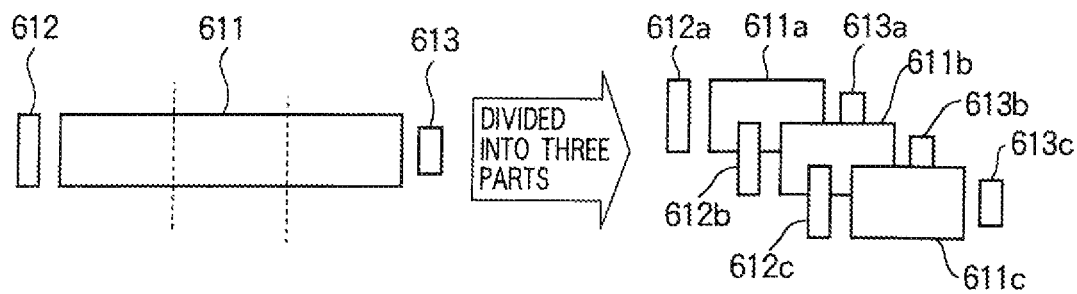
FIG. 15 is a diagram illustrating an example of a division in the layout pattern generating apparatus according to the second embodiment, when the layout pattern generation target element is a resistor element.

FIG. 15 is a diagram illustrating an example of when a resistor is divided as the layout pattern generation target element. The element arrangement figure generator 13 generates an arrangement figure in which the basic figure generated by the basic figure generator 11 is arranged in an arrangement determined depending on a kind of the element. In the example of FIG. 15, an effective area FIG. 611 is divided into three effective area FIGS. 611a, 611b and 611c; a terminal FIG. 612 is divided into three terminal FIGS. 612a, 612b and 612c; and a terminal FIG. 613 is divided into three terminal FIGS. 613a, 613b and 613c.

Figure 16:
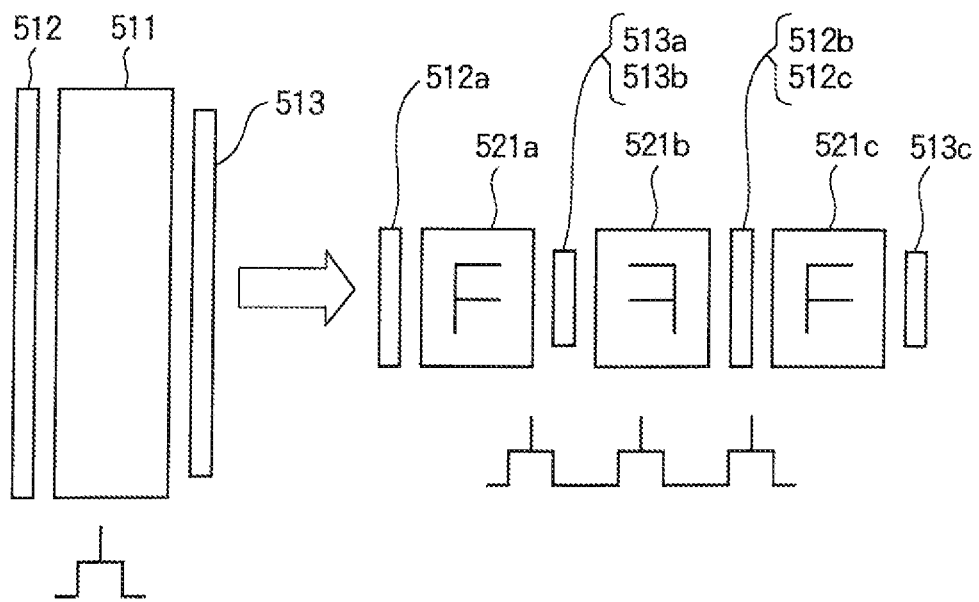
FIG. 16 is a diagram illustrating an example of an arrangement figure in the layout pattern generating apparatus according to the second embodiment, when a MOS transistor is divided.

FIG. 16 is a diagram illustrating an example of the arrangement figure generated when the MOS transistor is divided. In FIG. 16, letters "F" in basic FIGS. 521a, 521b and 521c help to know directions of the elements. In the second embodiment, the additional figure generator 12 generates all figures described in the additional figure relative position information 24 for all of the basic FIGS. 521a, 521b and 521c generated by the element arrangement figure generator 13 (step S7 in FIG. 29). The figures are generated in consideration of a direction of the basic figure in the layout pattern generation target element, as well as a relative position described in the additional figure relative position information 24. At the time, it is arranged so that the terminal FIGS. 513a and 513b overlap with each other and the terminal FIGS. 512b and 512c overlap with each other.

Figure 17:
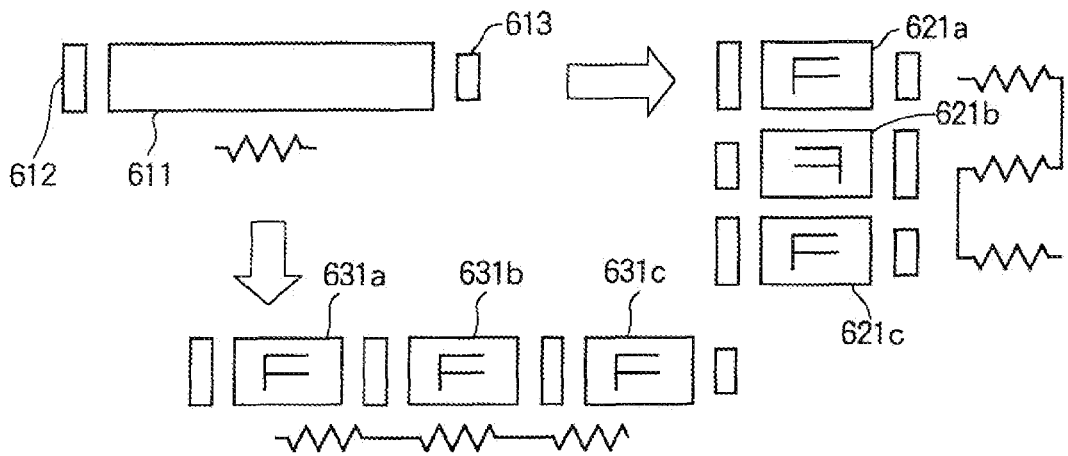
FIG. 17 is a diagram illustrating an example of an arrangement figure in the layout pattern generating apparatus according to the second embodiment, when a resistor element is divided.

FIG. 17 is a diagram illustrating an example of the arrangement figure generated when the resistor is divided. In FIG. 17, letters "F" in basic FIGS. 621a, 621b and 621c and in basic FIGS. 631a, 631b and 631c help to know directions of the elements. The additional figure generator 12 generates all figures described in the additional figure relative position information 24 for all of the basic FIGS. 621a, 621b and 621c or the basic FIGS. 631a, 631b and 631c generated by the element arrangement figure generator 13. The figures are generated in consideration of a direction of the basic figure in layout pattern generation target element, as well as a relative position described in the additional figure relative position information 24.

Figure 18:
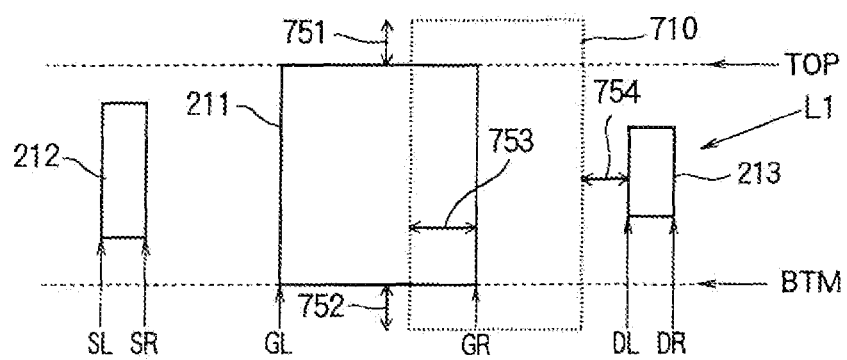
FIG. 18 is a diagram illustrating an example of a layout pattern generated in the layout pattern generating apparatus according to the second embodiment, when the layout pattern generation target element is the MOS transistor.

FIG. 18 is a diagram illustrating a definition example on a first drawing layer L1 defined by using the additional figure relative position information 24 when the layout pattern generation target element is the MOS transistor. The definition example on the first drawing layer L1 defines an upper end, a lower end, a left end and a right end of a FIG. 710 on the first drawing layer L1. The upper end of the FIG. 710 is defined by a distance 751 from the upper end TOP of the effective area FIG. 211. The lower end of the FIG. 710 is defined by a distance 752 from the lower end BTM of the effective area FIG. 211. The left end of the FIG. 710 on the first drawing layer L1 is defined by a distance 753 from the right end GR of the terminal FIG. 211. The right end of the FIG. 710 is defined by a distance 754 from the left end DL of the terminal FIG. 213. For convenience of explanation, the upper end, a definition of the lower end, the left end and right end of the FIG. 710 on the first drawing layer L1 is described as follows:

"First Drawing Layer L1:
(TOP 751), (BTM 752), (GR 753), (DL 754)"

Figure 19:
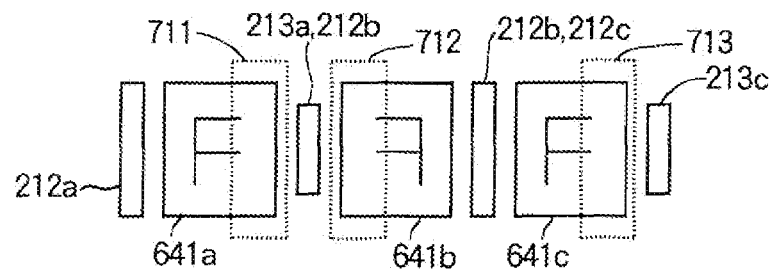
FIG. 19 is a diagram illustrating an example of an additional figure generated relative to effective area figure and terminal figure as a result of dividing the figure generated in FIG. 18 into three parts in the layout pattern generating apparatus according to the second embodiment, when the layout pattern generation target element is the MOS transistor.
Figure 20:
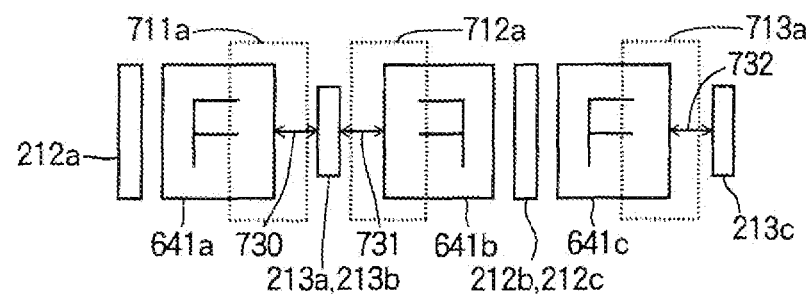
FIG. 20 is a diagram illustrating an example of the additional figure in FIG. 19 after an interval between the effective area figure and the terminal figure is enlarged as a result of changing an adjustment value in the layout pattern generating apparatus according to the second embodiment.

FIG. 19 is a diagram illustrating an example of additional figures generated when the element is divided into three basic FIGS. 641a, 641b and 641c; and FIG. 20 is a diagram illustrating an example that shapes of the additional figures are changed due to a difference in reference points after an adjustment value is changed. In FIG. 19 and FIG. 20, terminal FIGS. 212a, 212b and 212c correspond to the terminal FIG. 212 in FIG. 18; and terminal FIGS. 213a, 213b, 213c correspond to the terminal FIG. 213 in FIG. 18. In FIG. 19 and FIG. 20, the terminal FIGS. 213a and 213b overlap with each other, and the terminal FIGS. 212b and 212c overlap with each other. FIG. 19 is a diagram illustrating an example of a layout pattern generated when the layout pattern generation target element is the MOS transistor. When all of the additional figures described in the additional figure relative position information 24 are generated in FIG. 19, the whole figure information 25 is produced as a result and displayed by the display unit 6. The user can set an adjustment value, a division number and the like, through the operation input unit 5, while viewing the screen of the display unit 6. The user changes the displayed element, if necessary, such as the division number. The change is reflected in the figure adjustment value information 22, the whole figure information is regenerated, and figures in the regenerated whole figure information are displayed by the display unit 6 via the basic figure generator 11, the element arrangement figure generator 13 and the additional figure generator 12. FIG. 20 illustrates an example that intervals between the effective area figures and the terminal figures are enlarged by changing the adjustment value. FIG. 20 illustrates an example that distances 730 and 731 which are intervals between the effective area FIG. 211 and the terminal FIG. 213 of the terminal "B" of the layout pattern generation target element are enlarged. A distance 754 in FIG. 18 is adopted as the distances 730, 731 and 732 in the divided element illustrated in FIG. 20. The distances are the same in distance. More specifically, as illustrated in FIG. 18, the distance 754 between the effective area 710 and the drain terminal 213 is used as the adjustment value, i.e., it means that if the adjustment value is changed, all of the distances 730, 731 and 732 in FIG. 20 are changed.

As described above, the element arrangement figure generator 13 provides a method of arranging divided elements depending on a kind of the element and it is independent of a drawing reference value and a shape on a drawing layer necessary for masking process. As to an effective area in a general circuit design, it is a frequent practice to arrange a combination of a plurality of small-divided elements in order to obtain a desired area, when an element area is optimized in layout process. In the second embodiment where a division of an element is used as an adjustment value, layout capable of adjusting the element area in layout process can be generated only by inputting simple information on shapes of the terminal figure and the additional figure and the relative position, and therefore a complex layout in which an element has an efficient arrangement can be easily and efficiently generated.

Third Embodiment

Figure 21:
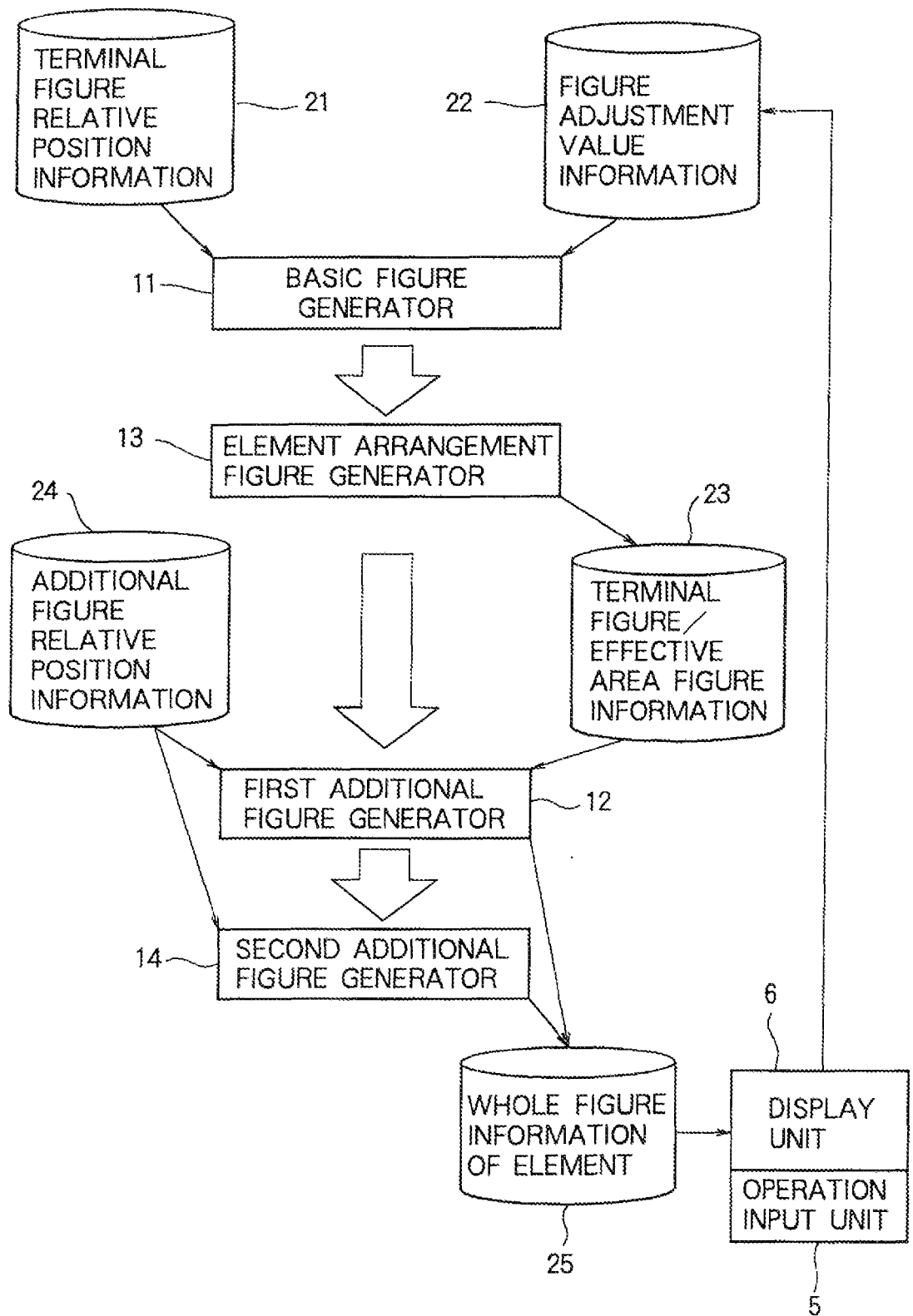
FIG. 21 is an explanatory diagram illustrating structure and operation of the layout pattern generating apparatus according to the third embodiment.
Figure 30:
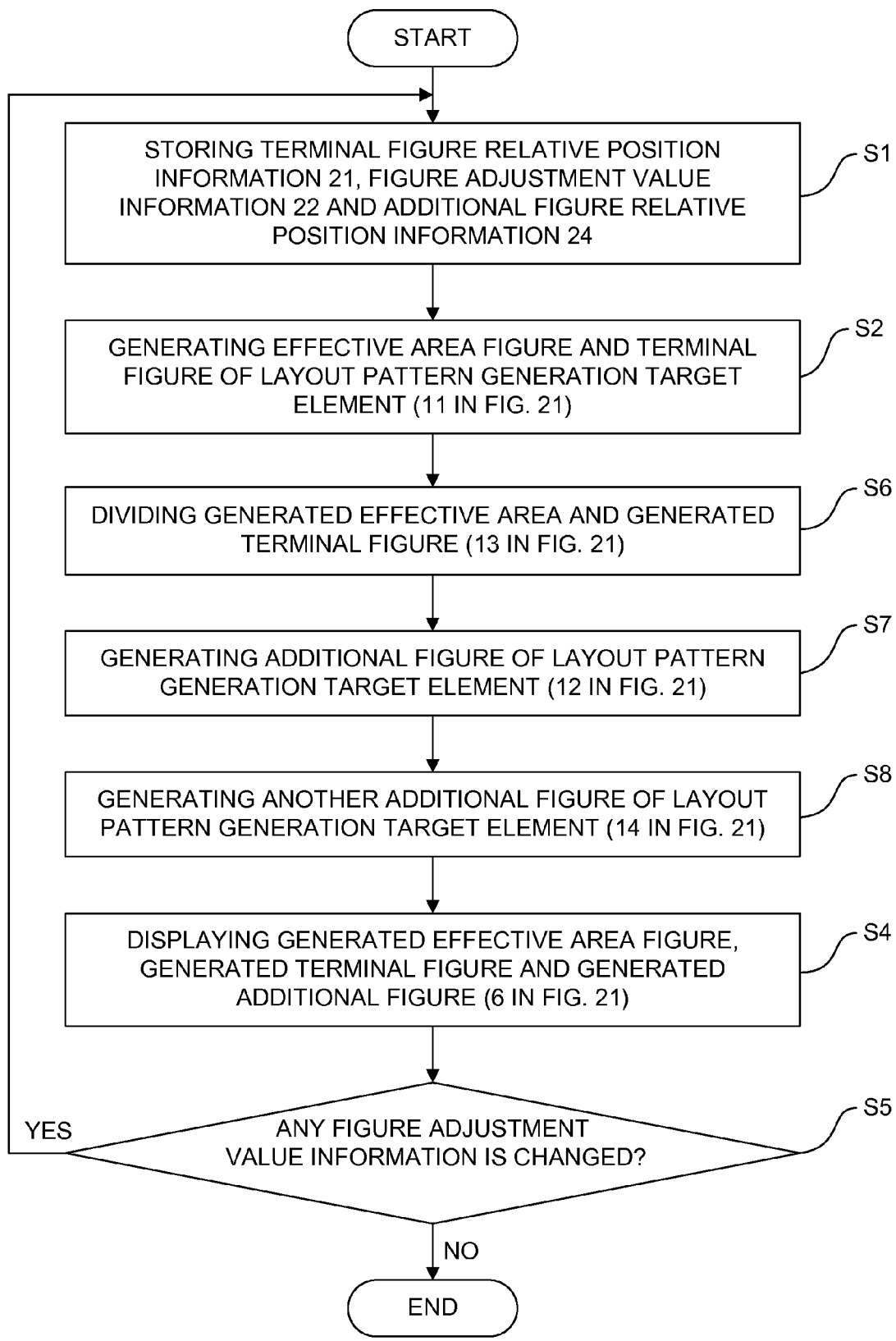
FIG. 30 is a flowchart illustrating a layout pattern generating method according to the third embodiment.

FIG. 21 is an explanatory diagram illustrating structure and operation of a layout pattern generating apparatus according to a third embodiment. In FIG. 21, constituent elements that are the same as or correspond to those in FIG. 13 are assigned the same reference characters. The layout pattern generating apparatus according to the third embodiment has a second additional figure generator 14 in addition to the first additional figure generator 12 as a means for generating an additional figure, and differs from the layout pattern generating apparatus according to the second embodiment in this point. The layout pattern generating apparatus performs the process illustrated in FIG. 30. The common steps in FIGS. 28 to 30 are labeled by the same references.

The second additional figure generator 14 performs a further processing on a figure. How to perform the further processing can be predefined and a content of the predefined further processing can be included in the additional figure relative position information 24. The second additional figure generator 14 is a device for generating a figure by performing the further processing as predefined in the additional figure relative position information 24, on the basis of a figure generated by the first additional figure generator 12 (step S8 in FIG. 30). Thus, the whole figure information 25 includes the figure generated by the second additional figure generator 14, in addition to the figure generated by the first additional figure generator 12.

The first additional figure generator 12 operates in the same manner as the additional figure generator in the second embodiment (reference numeral 12 in FIG. 13). The second additional figure generator 14 is a device for performing the further processing to generate another additional figure which is added to the figure generated by the first additional figure generator 12. An example of the further processing by the second additional figure generator 14 will be explained below.

Figure 22:
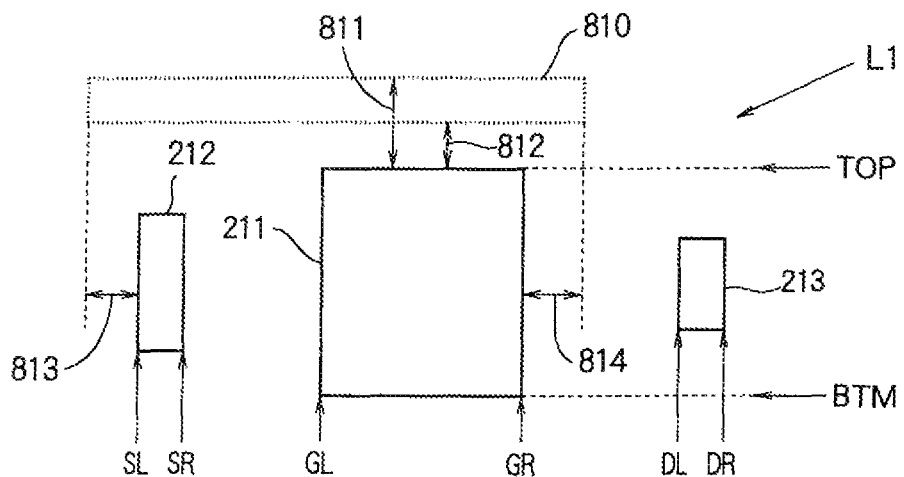
FIG. 22 is a diagram illustrating an example of a figure including an additional figure generated in the layout pattern generating apparatus according to the third embodiment.
Figure 24:
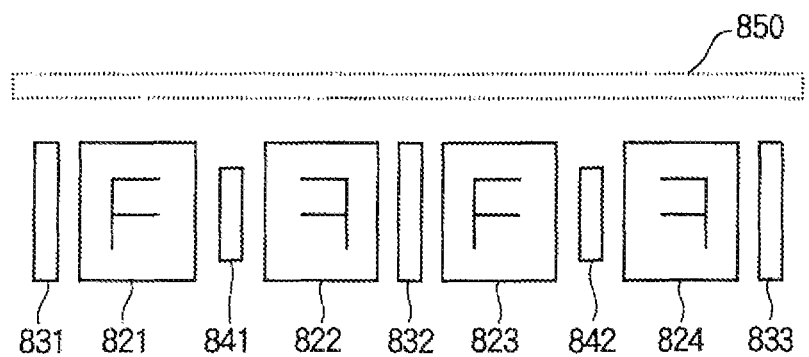
FIG. 24 is a diagram illustrating an example of another additional figure generated by a second additional figure generator in the layout pattern generating apparatus according to the third embodiment.

FIG. 22 to FIG. 24 are diagrams illustrating an example of a basic figure (the effective area FIG. 211 and the terminal FIGS. 212 and 213) generated by the basic figure generator 11 and an additional FIG. 810 generated as a result of the further processing by the second additional figure generator 14 on the additional figure generated by the first additional figure generator 12. In the example of FIG. 22 to FIG. 24, an inclusion figure which includes a plurality of figures generated by using the additional figure relative position information 24 generates. The example of FIG. 22 can be described as:

"First Drawing Layer L1:
(TOP 811), (TOP 812), (SL 813), (GR 814)"

FIG. 23 is a diagram illustrating an example of the figures generated by the first additional figure generator 12 when the element is divided into four parts. In FIG. 23, the effective area figure is divided into four FIGS. 821 to 824; the terminal figure is divided into FIGS. 831 to 833; said another terminal figure is divided into FIGS. 841 and 842; and the additional figure is divided into four FIGS. 810a to 810d. FIG. 24 is a diagram illustrating an example of the inclusion figure including another additional FIG. 850 generated by the second additional figure generator 14. In FIG. 24, the effective area figure is divided into the four FIGS. 821 to 824; the terminal figure is divided into the FIGS. 831 to 833; said another terminal figure is divided into the FIGS. 841 and 842; and the additional figure is the FIG. 850.

Figure 26:
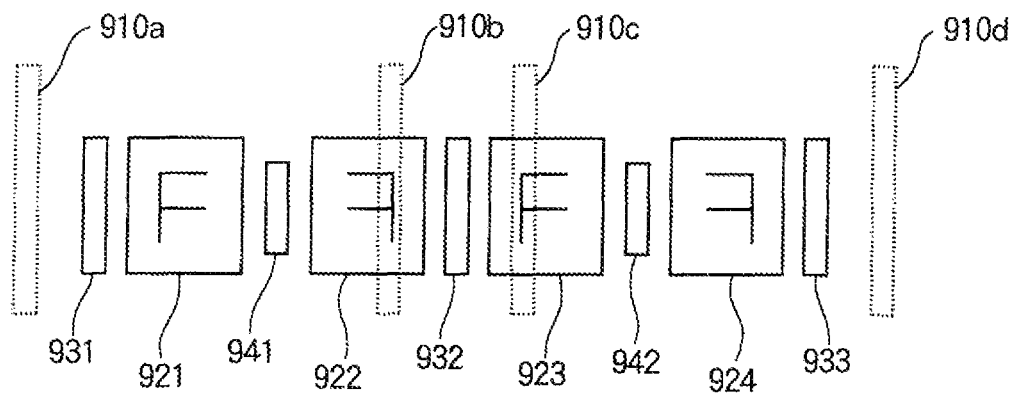
FIG. 26 is a diagram illustrating another example of the additional figure generated by the first additional figure generator in the layout pattern generating apparatus according to the third embodiment.
Figure 27:
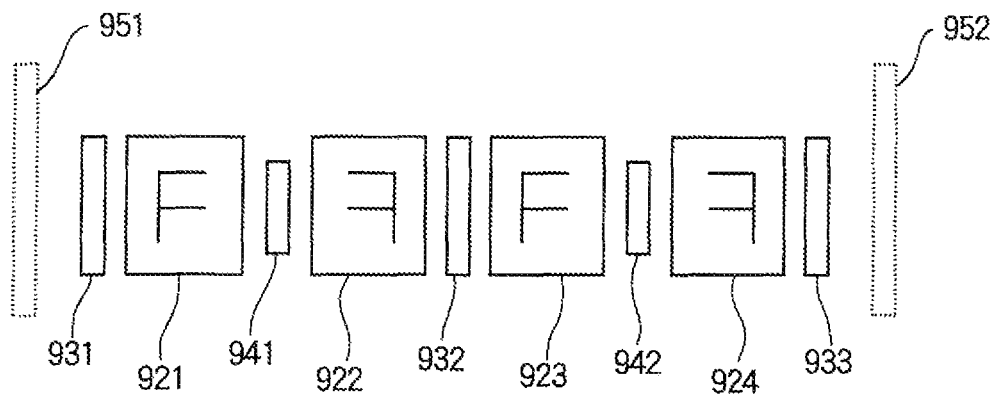
FIG. 27 is a diagram illustrating another example of another additional figure generated by the second additional figure generator in the layout pattern generating apparatus according to the third embodiment.

FIG. 25 to FIG. 27 are diagrams illustrating another example of the basic figure (the effective area FIG. 211 and the terminal FIGS. 212 and 213) generated by the basic figure generator 11 and an additional FIG. 910 generated as a result of the further processing by the second additional figure generator 14 on the additional figure generated by the first additional figure generator 12. In the example of FIG. 25 to FIG. 27, an inclusion figure which includes a plurality of figures generated by using the additional figure relative position information 24 is generated. The example of FIG. 25 can be described as:

"First Drawing Layer L2:
(TOP 911), (BTM 912), (SL 913), (SL 914)"

FIG. 26 is a diagram illustrating an example of figures generated by the first additional figure generator 12 when the element is divided into four parts. In FIG. 26, the effective are figure is divided into four FIGS. 921 to 924; the terminal figure is divided into FIGS. 931 to 933; said another terminal figure is divided into FIGS. 941 and 942; and the additional figure is divided into four FIGS. 910a to 910d. FIG. 27 is a diagram illustrating an example of the inclusion figure including additional FIGS. 951 and 952 which are generated by the second additional figure generator 14. In FIG. 27, the effective area figure is divided into the four FIGS. 921 to 924; the terminal figure is divided into the FIGS. 931 to 933; said another terminal figure is divided into the FIGS. 941 and 942; and the additional figures are the FIGS. 951 and 952 generated on both sides by the second additional figure generator 14.

As described above, the second additional figure generator 14 performs the further processing on the additional figure generated by the first additional figure generator 12 and thereby generates the FIG. 850 or 951 and 952. The second additional figure generator 14 enables to easily generate a figure surrounding a divided figure, a figure covering the whole element, a wiring figure connecting between divided elements or the like (i.e., a figure which includes the whole element) when the layout pattern generation target element is divided (as in the second embodiment).

Modified Example

Although the layout pattern generating apparatuses for generating layout for a transistor element are described in the first to third embodiments, the layout pattern generating apparatuses and layout pattern generating methods according to the first to third embodiments can be applied to generating a layout pattern in various elements mounted in an LSI such as a resistor element, a capacitor element and an inductor element, not limited to a transistor element.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A layout pattern generating apparatus for generating a layout pattern of each of elements included in a semiconductor integrated circuit, the layout pattern generating apparatus comprising:
   a storage;
   a basic figure generator;
   an additional figure generator;
   a display unit;
   an operation input unit; and
   an element arrangement figure generator;
   wherein
   the storage stores
      terminal figure relative position information including data describing a relative position of a terminal figure of a layout pattern generation target element relative to an effective area figure of the layout pattern generation target element,
      figure adjustment value information including data describing an adjustment value for a basic figure including the effective area figure and the terminal figure, and
      additional figure relative position information including data describing a relative position of an additional figure relative to the basic figure, the additional figure being a figure other than the basic figure;
   wherein the basic figure generator generates the effective area figure and the terminal figure of the layout pattern generation target element on the basis of the terminal figure relative position information and the figure adjustment value information;
   wherein the additional figure generator generates the additional figure of the layout pattern generation target element on the basis of the generated effective area figure, the generated terminal figure and the additional figure relative position information;
   wherein the display unit displays the generated effective area figure, the generated terminal figure and the generated additional figure;
   wherein the figure adjustment value information is changed depending on an input from the operation input unit;
   wherein the terminal figure relative position information includes data describing a relative position of an effective area figure of each layout pattern generation target element;
   wherein the element arrangement figure generator divides the generated effective area figure and the generated terminal figure; and
   wherein the additional figure generator performs the generating of the additional figure of the layout pattern generation target element, on the basis of the divided effective area figure, the divided terminal figure and the additional figure relative position information.

2. The layout pattern generating apparatus according to claim 1, wherein the layout pattern generation target element is an element selected from the group consisting of a transistor element, a resistor element, a capacitor element and an inductor element.

3. The layout pattern generating apparatus according to claim 1, wherein the terminal figure relative position information further includes data describing a relative position of two terminal figures of each of the layout pattern generation target elements.

4. The layout pattern generating apparatus according to claim 1, wherein the figure adjustment value information includes a width of the effective area figure, a height of the effective area figure and an interval between the terminal figure and the effective area figure.

5. The layout pattern generating apparatus according to claim 4, wherein, in an initial state, each of the width of the effective area figure, the height of the effective area figure and the interval between the terminal figure and the effective area figure is a minimum value of drawing reference values.

6. A layout pattern generating apparatus for generating a layout pattern of each of elements included in a semiconductor integrated circuit, the layout pattern generating apparatus comprising:
   a storage;
   a basic figure generator;
   an additional figure generator;
   a display unit;
   an operation input unit; and
   an another additional figure generator;
   wherein
   the storage stores
      terminal figure relative position information including data describing a relative position of a terminal figure of a layout pattern generation target element relative to an effective area figure of the layout pattern generation target element,
      figure adjustment value information including data describing an adjustment value for a basic figure including the effective area figure and the terminal figure, and
      additional figure relative position information including data describing a relative position of an additional figure relative to the basic figure, the additional figure being a figure other than the basic figure;
   wherein the basic figure generator generates the effective area figure and the terminal figure of the layout pattern generation target element on the basis of the terminal figure relative position information and the figure adjustment value information;
   wherein the additional figure generator generates the additional figure of the layout pattern generation target element on the basis of the generated effective area figure, the generated terminal figure and the additional figure relative position information;

wherein the display unit displays the generated effective area figure, the generated terminal figure and the generated additional figure;

wherein the figure adjustment value information is changed depending on an input from the operation input unit;

wherein the terminal figure relative position information includes data describing a relative position of an effective area figure of each layout pattern generation target element;

wherein the another additional figure generator generates another additional figure of the layout pattern generation target element, on the basis of the generated effective area figure, the generated terminal figure, and the additional figure relative position information; and wherein the display unit displays the generated effective area figure, the generated terminal figure, and the generated additional figure and said another generated additional figure.

7. The layout pattern generating apparatus according to claim 6, wherein the layout pattern generation target element is an element selected from the group consisting of a transistor element, a resistor element, a capacitor element and an inductor element.

8. The layout pattern generating apparatus according to claim 6, wherein the terminal figure relative position information further includes data describing a relative position of two terminal figures of each layout pattern generation target element.

9. The layout pattern generating apparatus according to claim 6, wherein the figure adjustment value information further includes a width of the effective area figure, a height of the effective area figure and an interval between the terminal figure and the effective area figure.

10. The layout pattern generating apparatus according to claim 9, wherein, in an initial state, each of the width of the effective area figure, the height of the effective area figure and the interval between the terminal figure and the effective area figure is a minimum value of drawing reference values.

11. A layout pattern generating method being carried out by an apparatus for generating a layout pattern of each of elements included in a semiconductor integrated circuit, the method comprising:

storing terminal figure relative position information, figure adjustment value information and additional figure relative position information in a storage, the terminal figure relative position information including data describing a relative position of a terminal figure relative to an effective area figure of the layout pattern generation target element, the figure adjustment value information including data describing an adjustment value for a basic figure including the effective area figure and the terminal figure, the additional figure relative position information including data describing a relative position of an additional figure relative to the basic figure, the additional figure being a figure other than the basic figure;

generating the effective area figure and the terminal figure of the layout pattern generation target element on the basis of the terminal figure relative position information and the figure adjustment value information;

generating the additional figure of the layout pattern generation target element on the basis of the generated effective area figure, the generated terminal figure and the additional figure relative position information;

displaying the generated effective area figure, the generated terminal figure and the generated additional figure on a display unit;

changing the figure adjustment value information depending on an input from an operation input unit; and dividing the generated effective area figure and the generated terminal figure;

wherein the terminal figure relative position information includes data describing a relative position of an effective area figure of each layout pattern generation target element; and wherein the generating of the additional figure of the layout pattern generation target element is performed on the basis of the divided effective area figure and the divided terminal figure and the additional figure relative position information.

12. The method according to claim 11, wherein the layout pattern generation target element is an element selected from the group consisting of a transistor element, a resistor element, a capacitor element and an inductor element.

13. The method according to claim 11, wherein the terminal figure relative position information further includes data describing a relative position of two terminal figures of each layout pattern generation target element.

14. The method according to claim 11, wherein the figure adjustment value information further includes a width of the effective area figure, a height of the effective area figure and an interval between the terminal figure and the effective area figure.

15. The method according to claim 14, wherein, in an initial state, each of the width of the effective area figure, the height of the effective area figure and the interval between the terminal figure and the effective area figure is a minimum value of drawing reference values.

16. A layout pattern generating method being carried out by an apparatus for generating a layout pattern of each of elements included in a semiconductor integrated circuit, the method comprising:

storing terminal figure relative position information, figure adjustment value information and additional figure relative position information in a storage, the terminal figure relative position information including data describing a relative position of a terminal figure relative to an effective area figure of the layout pattern generation target element, the figure adjustment value information including data describing an adjustment value for a basic figure including the effective area figure and the terminal figure, the additional figure relative position information including data describing a relative position of an additional figure relative to the basic figure, the additional figure being a figure other than the basic figure;

generating the effective area figure and the terminal figure of the layout pattern generation target element on the basis of the terminal figure relative position information and the figure adjustment value information;

generating the additional figure of the layout pattern generation target element on the basis of the generated effective area figure, the generated terminal figure and the additional figure relative position information;

displaying the generated effective area figure, the generated terminal figure and the generated additional figure on a display unit;

changing the figure adjustment value information depending on an input from an operation input unit; and generating another additional figure of the layout pattern generation target element, on the basis of the generated effective area figure, the generated terminal figure and the additional figure relative position information;

wherein the terminal figure relative position information includes data describing a relative position of an effective area figure of each layout pattern generation target element; and wherein said another generated additional figure is also displayed in the displaying the generated effective area figure, the generated terminal figure and the generated additional figure on the display unit.

17. The method according to claim 16, wherein the layout pattern generation target element is an element selected from the group consisting of a transistor element, a resistor element, a capacitor element and an inductor element.

18. The method according to claim 16, wherein the terminal figure relative position information further includes data describing a relative position of two terminal figures of each layout pattern generation target element.

19. The method according to claim 16, wherein the figure adjustment value information includes a width of the effective area figure, a height of the effective area figure and an interval between the terminal figure and the effective area figure.

20. The method according to claim 19, wherein, in an initial state, each of the width of the effective area figure, the height of the effective area figure and the interval between the terminal figure and the effective area figure is a minimum value of drawing reference values.

* * * * *